June 7, 1966  J. W. SADVARY ETAL  3,255,448
ANGULAR DISPLACEMENT PHASE SHIFT ENCODER ANALOG
TO DIGITAL CONVERTER
Filed Jan. 30, 1963  2 Sheets-Sheet 1

INVENTORS
JOHN W. SADVARY
MICHAEL POCHTAR
ISIDOR T. FLAUM
BY Roland Plottel
ATTORNEY

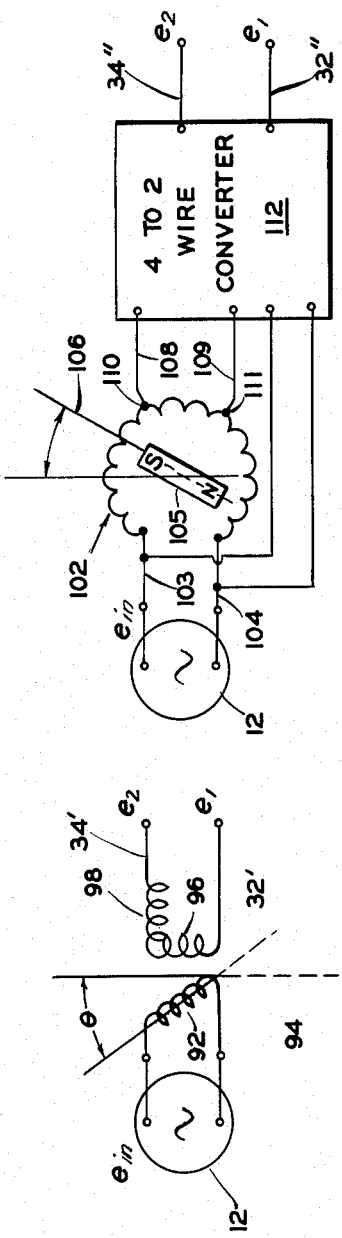
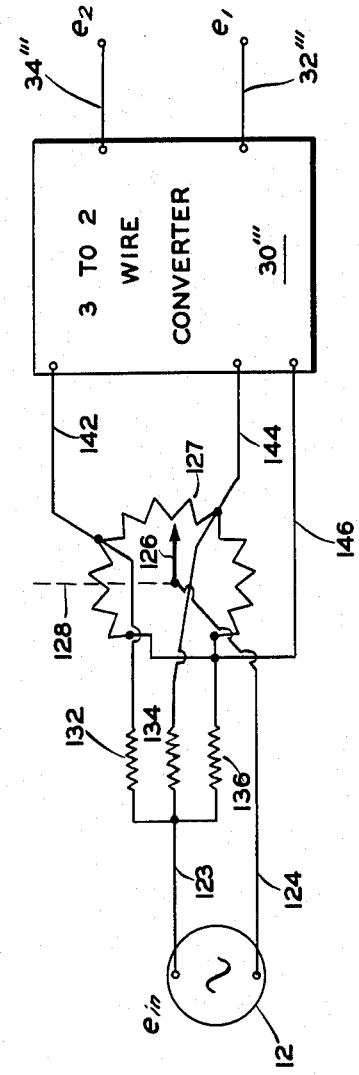

United States Patent Office 3,255,448
Patented June 7, 1966

3,255,448
ANGULAR DISPLACEMENT PHASE SHIFT ENCODER ANALOG TO DIGITAL CONVERTER
John W. Sadvary, Garfield, Michael Pochtar, Livingston, and Isidor T. Flaum, Hasbrouck Heights, N.J., assignors to The Bendix Corporation, Teterboro, N.J., a corporation of Delaware
Filed Jan. 30, 1963, Ser. No. 254,973
8 Claims. (Cl. 340—347)

The invention relates generally to analog to digital converters and in particular to angular displacement phase shift encoder analog to digital converters.

One type of analog to digital converter presently available and widely used employs a phase shift encoder and uses time as an intermediary analog signal. In this type of conversion, a sinusoidal reference signal is applied to a resolver, synchro, or other such electromechanical device whose rotor is displaced in accordance with an input analog mechanical rotation to provide two output signals whose amplitudes vary in accordance with the sine and cosine of the angle of rotation imparted to the rotor of the resolver, synchro, or other electromechanical device. The output signals are applied to a phase shifter which converts the amplitude varying output signals to a phase displaced signal having a phase angle displacement proportional to the relative amplitudes of the signals and which is proportional to the angular displacement of the rotor of the resolver, synchro, or other such electromechanical device. The zero crossings of the reference signal and the phase shifted signal are both detected. When a zero crossing of the reference signal occurs, a gate circuit is opened and fixed frequency clock pulses are admitted to a counter. When a zero crossing of the phase shifted signal occurs, the gate is closed and no more signals enter the counter. The number of signals that entered the counter is then a measurement of the phase shift which is proportional to the mechanical rotation imparted to the resolver, synchro, or other such electromechanical device.

The above type of electromechanical input phase shift encoder has been discussed in standard books such as Susskind, Notes on Analog-Digital Conversion Techniques, New York, Wiley (1956), cf. pages 6–8 ff. A limitation on the accuracy of the phase shift encoder is due to the resolver, synchro, or other such electromechanical device. A phase distortion is introduced by these devices. This distortion is partially a function of the temperature ambient to the electrochemical device.

It is an object of this invention to provide in an analog to digital converter having an electromechanical input transducer a circuit that will compensate for the temperature sensitive phase distortion introduced by the resolvers, synchros, or other such electromechanical device.

Another object of the invention is to provide a novel analog circuit receiving an angular displacement and providing two electrical signals having a phase difference proportional to mechanical angular displacement.

Another object of the invention is to provide a novel phase shift encoder with compensation to overcome the phase distortions introduced by the input transducer.

Another object of the present invention is to provide a novel phase shift encoder having greater accuracies than heretofore available.

Another object of the invention is to provide a novel phase shift encoder analog to digital converter having a simple design of great accuracy.

The invention contemplates a circuit including a source of alternating excitation voltage, means connected to the source for receiving the voltage therefrom and having a mechanical input member adapted to be angularly displaced, and providing two voltages having relative amplitude variations in accordance with the angular displacement of the member and a small erroneous phase displacement. The circuit includes a phase shifting network connected to the means, for receiving the two voltages therefrom, providing a signal whose phase includes a displacement proportional to the angular displacement of the input member and the erroneous displacement, and a reference signal selector connected to the means for receiving the two voltages therefrom for selecting as a reference signal the larger of the two voltages. The circuit includes measuring means for measuring the phase difference of the two signals, and since both signals contain the same erroneous phase displacement, the measuring means measures only the phase displacement proportional to the angular displacement of the member.

These and other objects and features of the invention are pointed out in the following description in terms of the embodiments thereof which are shown in the accompanying drawings. It is to be understood, however, that the drawings are for the purpose of illustration, only and are not a definition of the limits of the invention, reference being had to the appended claims for this purpose.

In the drawings:

FIGURE 2 is a resolver electromechanical transducer for use in the circuit of FIGURE 1.

FIGURE 3 is an electromechanical input transducer having a permanent magnet rotor for use in the circuit of FIGURE 1.

FIGURE 4 is a tapped potentiometer electromechanical input transducer for use in the circuit of FIGURE 1.

Figure 1:
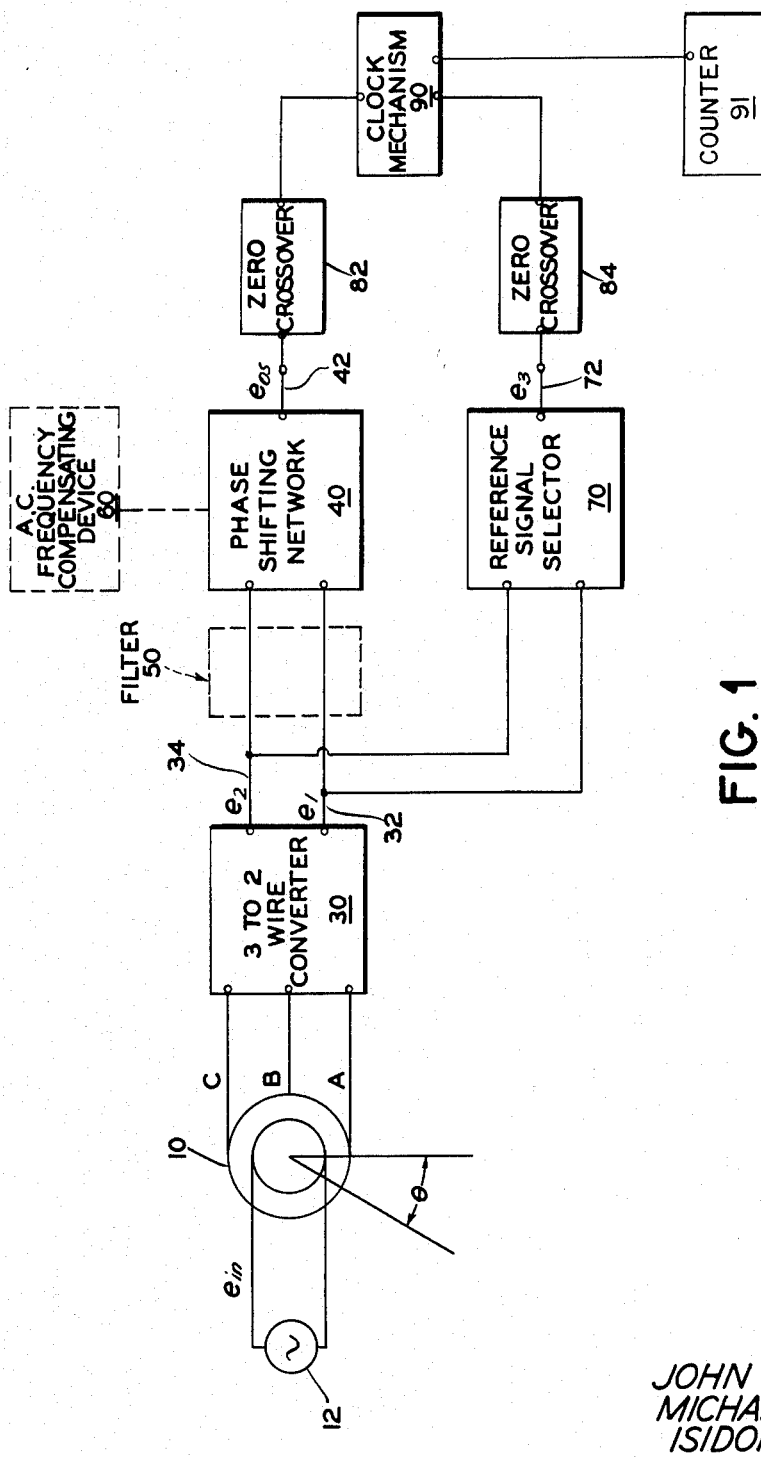
FIGURE 1 is a block diagram of a circuit constructed in accordance with the invention.

Referring to the drawing of FIGURE 1, there is shown a circuit constructed in accordance with the invention. A transducer, which is shown here as a synchro 10, is excited by a voltage $e_{in}$ from a source 12 where (1) $$e_{in} = k \sin wt$$

The transducer 10 can be positioned to a mechanical angle $\theta$. The output of the transducer consists of voltages across conductors A, B, and C where the voltage across lines BC is equal to (2) $$V_{BC} = K_I E \sin(wt + \alpha_1) \sin \theta$$

and the voltage across lines $C_A$ is (3) $$V_{CA} = K_I E \sin(wt + \alpha_1) \sin(\theta - 120)$$

and the voltage across lines AB is (4) $$V_{AB} = K_I E \sin(wt + \alpha_1) \sin(\theta + 120)$$

A three to two wire converter device 30 is connected to the synchro 10 and receives the voltages on lines C, B, and A and develops voltages $e_1$ and $e_2$ respectively on output conductors 32 and 34. The converter 30 may be a Scott connected transformer or any other conventional or convenient three to two wire converter device. The sole restriction on the converter is that it be able to accept the three line-to-line voltages $V_{BC}$, $V_{CA}$, and $V_{AB}$, generated in the windings of the transducer 10 by the excitation voltage $e_{in}$, and develop output voltages $e_1$ and $e_2$ where voltages $e_1$ and $e_2$ are as follows.

(5) $$e_1 = K_1 E \sin(wt + \alpha_2) \cos \theta$$

(6) $$e_2 = K_1 E \sin(wt + \alpha_2) \sin \theta$$

In the preceding formulae, $K_1$ is a constant depending upon the transformation ratio between the primary and secondary winding of the transducer 10. $\alpha_1$ is equal to the phase shift between the excitation voltage $e_{in}$ and the outputs of the transducer 10. $\alpha_2$ is the total electrical phase shift including $\alpha_1$ between the input to the transducer and the output of the converter device 30. $\theta$ is the mechanical angle at which the transducer is positioned.

A phase shifting network 40 is connected to the three to two wire converter device 30 to receive the signals $e_1$ and $e_2$ and provide a phase shifted signal $e_{os}$ on output conductor 42 where $e_{os}$ is equal to (7) $\quad e_{os} = K_2 E \sin(wt + \alpha_2 + \tan^{-1} wCR \tan\theta)$ where $K_2$ is a constant. A summing device may be included in the phase shifting network, in this case a constant phase shift term will be added. Any type of phase shifting network may be used provided that the output contains the angle $\theta$ in a recognizable form. A filter 50 may be interjoined between converter device 30 and phase shifting network 40 and is a welcome addition if the excitation voltage $e_{in}$ contains excessive harmonics or the form of the transducer generates excessive harmonics in the output line-to-line voltages $V_{BC}$, $V_{CA}$, and $V_{AB}$. Normally, harmonic components in a sinusoidal voltage distort the shape without altering the zero crossing of the fundamental component of the wave shape. However, the phase shifting network, regardless of its form, must have complex input impedance which produces a different attenuation and phase shift in each harmonic. If harmonics were present and the filter were not used, voltage, $e_{os}$, would have both its zero crossings shifted and its waveform distorted thereby preventing the accurate measurement of the transducers mechanical position. An A.C. frequency compensating device 60, connected to the phase shifting network 40, may also be added if the phase shifter network is frequency sensitive. However, if the excitation frequency $w$ is constant or if the phase shifting network is made insensitive to phase shifting variations, the compensating device 60 may be omitted. In practice, frequency can, and does, vary so that compensation is required with the run of the mill phase shifting networks. With constant frequency or frequency compensation, and the following relationship (8) $\quad\quad\quad\quad WRC = 1$ Equation 7 simplifies to (9) $\quad\quad e_{os} = K_2 E \sin(wt + \alpha_2 + \theta)$ Thus, referring to the drawing of FIGURE 1 and Equation 9, it is readily seen that the mechanical position of the transducer input shaft $\theta$ has been translated to an analog voltage of constant magnitude whose electrical phase angle varies directly with $\theta$.

In the event a lagging angle minus $\theta$ is desired, it can be accomplished thusly: the transmitter output wires C and B are interchanged resulting in an output $e_2'$ from the converter device 30

(10) $\quad e_2' = K_1 E \sin(-\theta) \sin(wt + \alpha_2)$

The output of the summing and phase shifting network will then become

(11) $\quad\quad e_{os} = K_2 E (wt + \alpha_2 - \theta)$

As heretofore practiced, the output $e_{os}$ from the phase shifting network 40 was compared directly to the excitation voltage $e_{in}$. Using the excitation voltage as a reference signal, the resulting angular displacement as measured is

(12) $\quad\quad \underline{/e_{os}} - \underline{/e_{in}} = \underline{/\alpha_2 + \theta}$ or

(13) $\quad\quad \underline{/(wt + \alpha_2 + \theta)} - \underline{/(wt)} = \underline{/\alpha_2 + \theta}$ As heretofore practiced, the resulting information is the sum of the mechanical angle $\theta$ and a phase shift $\alpha_2$ which, as noted above, is a variable, and to a large extent is a function of temperature. It is the variable phase shift or phase distortion $\alpha_2$ which has limited the accuracy, and in turn the use, of the phase shifter encoder analog to digital converter.

The shortcomings of this technique can be overcome if the outputs $e_1$ and $e_2$ of the converter device 30 are used as reference signals. Referring to the drawing of FIGURE 1, a reference signal selector 70 is connected to the output conductors 32 and 34 of the converter device 30 to receive the signals $e_1$ and $e_2$. Selector 70 selects which of the signals $e_1$ or $e_2$ has the larger magnitude and applies this voltage to an output conductor 72. The output voltage may be termed $e_3$, where $e_3$ is equal to either

(14) $\quad K_3 E \sin(wt + \alpha_2) \cos\theta$ or $K_3 E \sin(wt + \alpha_2) \sin\theta$ where $K_3$ is a constant. With the output voltage $e_3$ on conductor 72 used as a reference voltage for comparison with $e_{os}$, the resulting phase difference is

(15) $\quad\quad \underline{/e_{os}} - \underline{/e_3} = \underline{/\theta}$

(16) $\quad\quad \underline{/wt + \alpha_2 + \theta} - \underline{/wt + \alpha_2} = \underline{/\theta}$ Thus, the resultant information is free from the phase distortion $\alpha_2$.

The signal $e_{os}$ from phase shift network 40 and the signal $e_3$ from reference selector 70 are applied to zero crossing detector circuits 82 and 84, respectively, which provide a pulse coincident with the zero crossing of the applied signal. The zero crossover detectors 82 and 84 are connected to a clock mechanism 90 which may be of any convenient or conventional type. One type of clock mechanism employs a constantly running high frequency pulse generator. A pulse from one zero crossover detector, for example 82, operates a gate in the clock mechanism which enables pulses to pass from the pulse generator of the clock mechanism 90 to a counter 91 for recording. A pulse from the other zero crossover detector 84 closes the gate of the clock mechanism 90 blocking subsequent pulses from the clock to the counter. The phase angle difference between the two signals (see Equation 15), is proportional to the mechanical rotation $\theta$ applied to the transducer 10 and is readily computed from the frequency of the pulse generator, the pulses counted into the counter and the frequency of the reference signal.

The invention has been shown with a synchro transducer 10 and a three to two wire converter 30. The invention is not limited thereto and will function satisfactorily, for example, with a resolver replacing the synchro 10 and converter 30 as is shown in FIGURE 2. In FIGURE 2, the resolver has a rotor winding 92 connectable across the source 12 of excitation to receive the voltage $e_{in}$. The rotor 92 is adapted to be mechanically displaced by an input shaft 94. A pair of stator windings 96 and 98 are magnetically coupled with the rotor winding 92 and provide on output conductors 32' and 34' voltages which vary respectively in amplitude with the cosine and sine of the angular displacement of the rotor 92. The signals induced on these windings may be designated $e_1$ and $e_2$.

As a third example of a different type of input transducer, there is shown in FIGURE 3 a transducer having a winding 102 connected to a source 12 of excitation providing a signal $e_{in}$ across conductors 103 and 104, and having a permanent magnet rotor 105 adapted to be angularly displaced by a member 106, and conductors 108 and 109 connected to tapped terminals 110 and 111 on the windings. The conductors 108, 109, 103 and 104 are connected to a four to two wire converter 112 which may be of any convenient or conventional design capable of converting the four voltages on conductors 103, 104, 108, and 109 to two voltages $e_2$ and $e_1$ which vary in amplitudes in accordance with the angular displacement of the magnetic rotor 105, and then apply these voltages on conductors 32" and 34". It should be noted, however, that the transducer is of the second harmonic type and the frequency is doubled at the output of the four to two wire converter, as is well known.

For a further example of an electromechanical input transducer, there is shown in FIGURE 4 a pair of input conductors 123 annd 124 connected to the source 12 of alternating reference potential to receive the signal $e_{in}$. Conductor 124 is connected to a wiper arm 126 adapted to be angularly displaced by mechanical member 128. Wiper arm 126 makes mechanical and electrical contact with potentiometer windings 127. The conductor 123 is connected through three parallel resistors 132, 134, and 136 to tapped positions on the potentiometer winding and these tap positions are connected by conductors 142, 144, and 146 to the three to two wire converter device 30''' which converts the signal on winding 142, 144, and 146 to two voltages $e_2$ and $e_1$ which vary in amplitude in accordance with the angular displacement of the wiper arm 126, and the converter 30''' then applies these voltages $e_1$ and $e_2$ to output conductors 32''' and 34'''.

The invention has been shown with a synchro transducer and a three to two wire converter in FIGURE 1, a resolver in FIGURE 2, a transducer with a permanent magnet rotor and converter in FIGURE 3, and a tapped potentiometer and converter in FIGURE 4. The invention is not limited to these particular types of transducers and will function satisfactorily with any other electromechanical input transducer with or without a converter so long as the relation expressed in Equations 1, 5 and 6 is maintained.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A circuit comprising a source of excitation voltage, means connected to the source and energized by the excitation voltage and having one part adapted to be displaced to provide two voltages whose amplitudes vary in accordance with the sine and cosine of the displacement and whose phase is distorted from the excitation voltage, a phase shifting network connected to the means and responsive to the two voltages and providing an output signal whose phase is displaced from the excitation voltage by an amount corresponding to the displacement of the one part and the phase distortion, a reference signal selector connected to the means and responsive to the two voltages therefrom and providing as a reference signal a voltage corresponding to the voltage of larger magnitude, and means connected to the phase shifting network and the reference signal selector for comparing the relative phase displacement of the output signal and the reference signal for providing an output corresponding thereto.

2. A displacement phase shift encoder analog to digital converter comprising a source of excitation voltage, means connected to the source and energized by the excitation voltage and providing two voltages whose amplitudes vary in accordance with the sine and cosine of the displacement and whose phase is distorted from the excitation voltage, a phase shifting network connected to the means and responsive to the two voltages therefrom and providing an output signal whose phase is displaced from the excitation voltage by an amount corresponding to the displacement and the phase distortion, a reference signal selector connected to the means and responsive to the two voltages therefrom and providing as a reference signal a voltage corresponding to the voltage of larger magnitude, detection means connected to the phase shifting network and to the reference signal selector and responsive to the output signal and reference signal and measuring the phase difference between the output signal and the reference signal, and means connected to the detection means and providing a digital output corresponding to the phase difference.

3. A circuit comprising a source of alternating excitation voltage, means connected to the source and energized by the excitation voltage and having a mechanical input member adapted to be displaced to provide two voltages having relative amplitude variations in accordance with the displacement of the member and a small erroneous phase displacement, a phase shifting network connected to the means and receiving the two voltages therefrom and providing an output signal phase displaced in proportion to the angular displacement of the input member and the erroneous displacement, a reference signal selector connected to the means and receiving the two voltages therefrom and selecting as a reference signal the larger of the two voltages, and measuring means connected to the phase shifting network and to the reference signal selector for measuring the phase difference of the output signal and reference signal.

4. A circuit as defined in claim 3 in which the means connected to the source includes a resolver having a rotor adapted to be angularly displaced, the rotor having a winding thereon connected to the source and energized by the excitation voltage, and the resolver having two stator windings for providing the two voltages.

5. A circuit as defined in claim 3 in which the means connected to the source comprises a synchro having a rotor as the mechanical input member adapted to be angularly displaced, the rotor having a winding thereon connected to the source and energized by the excitation voltage, the synchro having at least three stator windings providing voltages which vary in amplitude in accordance with the angular displacement of the rotor, and a converter device connected to the stator windings for receiving the voltages therefrom and converting these voltages to two voltages whose relative amplitudes vary in accordance with the angular displacements of the rotor and whose phases include a small erroneous displacement, the converter device being connected to the phase shifting network and the reference signal selector.

6. A circuit as defined in claim 3 in which the means connected to the source comprises a device having field windings connected to the source and energized by the excitation voltage and having a permanent magnet rotor as the mechanical input member adapted to be angularly displaced and having tapped connection on the windings providing voltages which vary in amplitude in accordance with the angular displacement of the rotor, a converter device connected to the field winding for receiving the voltages thereon and converting these voltages to two voltages whose relative amplitude varies in accordance with the angular displacement of the rotor and which includes a small erroneous phase displacement, the converter device being connected to the phase shifting network and the reference signal selector.

7. A circuit as defined in claim 3 in which the means connected to the source comprises a tapped potentiometer having a resistance winding connected to the source and energized by the excitation voltage and having a rotor wiper arm as the mechanical input member adapted to be angularly displaced and having tapped connections on the resistance winding providing voltages which vary in amplitude in accordance with the angular displacement of the rotor wiper arm, and a converter device connected to the stator winding for receiving the voltages thereon and converting these voltages to two voltages whose relative amplitude varies in accordance with the angular displacements of the rotor wiper arm and whose phase includes a small erroneous displacement, the converter device being connected to the phase shifting network and the reference signal selector.

8. A circuit for providing an output corresponding to the displacement of a signal generator and free from an unwanted phase displacement inherent in the signal generator, the signal generator providing two voltages having relative amplitudes in accordance with the displacement and the unwanted phase displacement, comprising a phase shifting network connected to the signal generator and responsive to the two voltages therefrom and providing an output signal phase displaced in accordance with the displacement of the signal generator and the unwanted phase displacement, a reference signal selector connected to the signal generator and responsive to the two voltages therefrom and providing as a reference signal a voltage corresponding to the larger of the two voltages, and means connected to the phase shifting network and to the reference signal selector for measuring the phase difference between the output signal and reference signal and providing an output corresponding thereto.

References Cited by the Examiner

UNITED STATES PATENTS

| | | | |
|---|---|---|---|
| 2,850,240 | 9/1958 | Dickinson | 340—347 |
| 2,947,929 | 8/1960 | Bower | 340—347 |
| 3,045,230 | 7/1962 | Tripp et al. | 340—347 |
| 3,147,473 | 9/1964 | Ujejski | 340—347 |
| 3,156,907 | 11/1964 | Lanning | 340—198 |

MALCOLM A. MORRISON, *Primary Examiner.*

D. M. ROSEN, W. J. ATKINS, *Assistant Examiners.*